(12) United States Patent
Feng

(10) Patent No.: US 8,854,806 B2
(45) Date of Patent: Oct. 7, 2014

(54) MEMORY PROTECTION DEVICE AND COMPUTER

(76) Inventor: Lin Feng, Shenzhen (CN)

( * ) Notice: Subject to any disclaimer, the term of this patent is extended or adjusted under 35 U.S.C. 154(b) by 144 days.

(21) Appl. No.: 13/390,103

(22) PCT Filed: Jul. 26, 2010

(86) PCT No.: PCT/CN2010/075453
§ 371 (c)(1),
(2), (4) Date: Mar. 27, 2012

(87) PCT Pub. No.: WO2011/017996
PCT Pub. Date: Feb. 17, 2011

(65) Prior Publication Data
US 2012/0268885 A1    Oct. 25, 2012

(30) Foreign Application Priority Data
Aug. 11, 2009   (CN) .......................... 2009 1 0108892

(51) Int. Cl.
*H05K 5/00* (2006.01)
*H05K 7/00* (2006.01)
*F16H 27/02* (2006.01)
*G06F 1/18* (2006.01)

(52) U.S. Cl.
CPC ..................... *G06F 1/185* (2013.01)
USPC ............ 361/679.46; 361/679.32; 361/679.31; 361/679.52; 361/679.54; 74/141; 74/387

(58) Field of Classification Search
CPC ..... H05K 1/0203; H05K 1/0272; H05K 7/20; H05K 1/0254; H05K 1/0927; H05K 1/0281; G06F 2200/201; G06F 2200/202; G06F 2200/203; G06F 1/00; G06F 1/20; G06F 1/201; F28F 3/12; F28F 3/02; F28F 2260/00; F28F 2260/02; H01L 23/44; H01L 23/445; H01L 23/46; H01L 23/467; H01L 23/473; H01L 23/4735
USPC ............... 361/679.52–679.54, 689, 699, 700, 361/703, 704–705, 706, 709, 715, 716, 718, 361/719, 679.01–679.09, 679.1–679.19, 361/679.31–679.45, 679.55–679.6, 361/724–747; 174/15.2, 16.3; 165/80.2–80.5, 104.33, 185; 248/80–88, 155.1–155.5, 166–173, 248/180.1–186.2, 229.1–231.51, 271.4, 248/292.14, 316.1–316.8; 74/141–169, 74/380–387; 292/1–62, 113, 292/169.11–169.23, 341.11–341.19
See application file for complete search history.

(56) References Cited

U.S. PATENT DOCUMENTS

| | | | |
|---|---|---|---|
| 2007/0165382 A1* | 7/2007 | Yu et al. | 361/704 |
| 2007/0263359 A1* | 11/2007 | Lai et al. | 361/715 |
| 2008/0251911 A1* | 10/2008 | Farnsworth et al. | 257/714 |

* cited by examiner

*Primary Examiner* — Jerry Wu

(57) ABSTRACT

A memory protection device and a computer including the memory protection device are disclosed. The memory protection device includes insulating heat-conducting bars which are provided on an upper end of slot arms at two sides of a memory connection base and cover up heat emitting holes of the slot arms.

13 Claims, 9 Drawing Sheets

MEMORY PROTECTION DEVICE AND COMPUTER

BACKGROUND OF THE PRESENT INVENTION

1. Field of Invention

The present invention belongs to a field of electrical connectors and relates to a memory protection device, and more particularly to a memory protection device against dust, loosening and oxidation provided above a memory connection base and a computer including the memory protection device.

2. Description of Related Arts

Computer crash, blue screen, a failure to start normally or a failure to enter the operating system after the start often occurs to a computer. Many reasons can cause that, but one main reason is the memory failure, including a memory corruption, an incompatibility and a failure in the connection between a memory connection base and a memory.

The incompatibility between the memory and the motherboard is caused by the memory and the motherboard and can be detected at the initial phase of the installment. It is easy to detect and solve the incompatibility.

The failure in the connection between the memory and the memory connection base is the most common memory failure in daily lives and also the factor leading to the highest maintenance cost.

A conventionally standardized memory connection base is shown in FIG. 1. The memory connection base has a memory slot 11, socket arms 12 provided at two sides of the memory slot 11, fastener arms 13 provided at two ends of the memory slot 11, hook fasteners 14 hinged with the fastener arms 13 for fixing a memory, pins 15 provided at a bottom of the memory connection base and crossing through the memory slot 11 and elastic reeds 16 (not shown in drawings) connected to the pins 15 and provided in perforated holes 121 of the socket arms 12, wherein heat emitting holes 122 are provided in upper ends of the socket arms 12.

A conventionally standardized memory bar is shown in FIG. 2. The memory 2 comprises a wiring board 21, memory granules 22 and electronic elements 23, wherein the memory granules 22 and the electronic elements 23 are welded on a side or two sides of the wiring board 21; two semi-circle bayonet connectors 211 are respectively provided at two ends of the wiring board 21; a plurality of connecting fingers 212 for contacting with the elastic reeds 16 are provided at a bottom of the two sides of the wiring board 21; a breach 213 for distinguishing a plugging direction of a memory is further provided at a bottom of the wiring board 21.

When the memory 2 is fully plugged into the memory slot 11, a front view of a connection structure of the memory 2 and the memory connection base 1 is shown in FIG. 3, wherein a "hook" 141 of the hook fastener 14 of the memory connection base and a lower end 2111 of the upper bayonet connector 211 at the two sides of the wiring board 21 are buckled with each other; a lower end of the wiring board 21 and a bottom 111 of the memory slot 11 contact with each other (marked with dotted lines). An upper end 2112 of the upper bayonet connector 211 at the two sides of the wiring board 21 further has a gap big enough to contain a "hook". Even when the "ear-shaped" hook fastener 14 is pulled outwards, a moving track thereof does not take up too much space. And thus the "hook" 141 is provided in the gap.

The failure in the connection between the memory and the memory connection base may be caused by following reasons.

Firstly, dust comes into the memory slot of the memory connection base, which results in that the connecting fingers of the memory and the elastic reeds of the memory connection base are also attached with some dust. When the dust exists between the elastic reeds of the memory connection base and the connecting fingers of the memory, the electrical connecting performance of the memory and the memory connection base is changed so that a computer failure may occur. The memory connection base tends to have dust for the following reasons. On one hand, the memory connection base is very close to the CPU heat emitting fans. The rotation of the CPU heat emitting fans accelerates the air flow around the CPU connection base. With the increasing air flow volume, more dust brought by the air flow deposits around the memory. A great deal of dust exists between the memory connection base and the memory so that a poor contact or a short circuit may occur. On the other hand, as shown in FIG. 1, the plurality of heat emitting holes above the perforated hole which has electricity-conducting reeds of the memory connection base provided therein are open so that dust tends to enter between the memory slot and the memory through the plurality of heat emitting holes and the perforated holes, which leads to a poor contact or a short circuit between the memory and the memory connection base.

A Chinese patent of 200620083522 discloses a memory dustproof device provided at a side of a memory near CPU fans. As shown in FIG. 4 (marks thereof are irrelevant to the present invention), the memory dustproof device comprises a dustproof board (1) and a fastener (3). A turnup is provided at an upper edge of the dustproof board (1) and is stuck on an upper edge of the memory from top to bottom. A lower edge of the dustproof board (1) leans against a lateral of a memory slot (5) (a memory connection base of the present invention). Bulges (2) are provided at two ends of the dustproof board (1) and the U-shaped fastener (3) has fixing holes, wherein the bulges (2) are fastened with the fixing holes. A vertical slot is provided at an end part of the U-shaped fastener 3 which is stuck at two vertical edges at two ends of a memory bar (4). The memory dustproof device separates the memory with a dust accumulating region so as to effectively decrease dust attached to the memory and protect the memory.

However, the above dustproof structure has a disadvantage of inconvenience in installing. The lower edge of the dustproof board leans against an external side of a slot arm of the memory connection base, but many motherboards are initially designed without considering leaving certain space for a dustproof board beside the external side of the slot arm of the memory connection base. Thus a distance between electrical elements and the memory connection base is usually too short to allow an insertion of the dustproof board, which greatly limits an application of the above memory protecting structure and requires considering a thickness of a dustproof board before designing a circuit of the motherboard.

Moreover, the above memory dustproof structure functions with limitations. Since two fastener arms at the two ends of the memory connection base are not well sealed, when the CPU fans rotate to blow air, dust is still able to enter elastic reeds of the memory connection base and connecting fingers of the memory through the two fastener arms at the two ends of the memory connection base to cause a failure in the connection between the memory and the memory connection base.

Secondly, the memory is loosened, which leads to a poor contact between the connecting fingers of the memory and the pins of the memory connection base and a weakened electrical connecting performance to result in a disorder of the memory in processing the computer data and further a computer failure such as a computer crash, a blue screen or a restart. A main reason for a loosened memory is that a movement or a shake made by man loosens the connection between the memory and the memory connection base. Moreover, an unreasonable design of a rigid connection structure between the memory connection base and the memory also leads to a loosened memory.

A conventional fastening structure between the memory and the memory connection base is shown in FIG. 3, wherein an "ear fastener" and the memory are connected in a rigid structure; the memory and the bottom of the memory slot of the memory connection base are also connected in a rigid structure. Actually, a rigid connecting structure is hardly able to work as a real fastener. However, a soft or an elastic connection structure between the memory and the memory connection base is able to work as a real fastener so that the connection between the memory and the memory connection base is free from being loosened by shaking.

Thirdly, the connecting fingers of the memory are oxidized. The elastic reeds of the memory connection base and the connecting fingers of the memory are exposed in the air and plated with gold on the surfaces without full protection (such as spraying protective agents). After a long time, the surfaces thereof are gradually oxidized and the coatings of gold are also carved by multiple insertions and pulls to further accelerate the oxidation. When the connecting fingers or the elastic reeds are oxidized, electrical connecting performance is severely affected as well as the data communication so that the computer system works unstably and unreliably. Especially under unstandardized maintenance, dust of the connecting fingers is often wiped by hand. The sweat on hands is left on the connecting fingers when people are wiping off the dust of the connecting fingers by hands. The certain amount of salt and water in the sweat not only accelerates the oxidation of the connecting fingers, but also changes a conductivity between the connecting fingers and the reeds and weakens the electrical connecting performance so as to greatly reduce a working stability of the computer.

A Chinese patent of 200610146231.9 discloses a method of protecting connecting fingers and contacts of a slot (the connection base of the present invention, similarly hereinafter) thereof against salt spray corrosion and oxidation, which adopts a protective mask to cover the card slot or the memory slot as well as a card inserted therein and the connecting fingers of the memory to prevent the metal contacts from being oxidized and corroded by a salt moisture, a. wherein an elastic card protective mask is covering upon the card slot and an upper part of the card protective mask has a crack for the card connecting fingers to pass to be inserted in the card slot; b. wherein the memory connecting fingers are inserted in the memory slot and the memory and the memory slot are wholly covered by the elastic memory slot protective mask.

The above method is able to prevent the oxidation of the connecting fingers and the reeds which is caused by contacting with the air outside, but fails to prevent the memory from loosening. Besides, a design of covering the memory connection base with the protective mask is inappropriate for a memory slot having many electrical elements too close to the memory connection base and thus the protective mask may not be inserted in the space between the electrical elements and the memory connection base.

Furthermore, since the memory and the memory connection base are wholly covered by the protective mask, a dissipation of heat produced by charging the mutually contacting connecting fingers and the reeds is affected. If the protective mask is made of metal heat-conducting materials, the electrical performance of the memory can be affected after the protective mask contacts with the memory granules of the memory.

As a conclusion, the conventional arts fail to effectively protect the memory from dust, loosening and oxidation, especially fail to simultaneously protect the memory from dust, loosening and oxidation, so as to thoroughly prevent the electrical connecting performance between the memory and the memory connection base from affecting the stability of a computer system.

SUMMARY OF THE PRESENT INVENTION

In order to overcome a failure of conventional arts to effectively protect against dust, loosening and oxidation, an object of the present invention is to provide a memory protection device based on a conventional memory connection base. The present invention is able to effectively prevent connecting fingers of a memory from being attached with dust, prevent the memory from being loosened and detached, prevent the connecting fingers of the memory from being oxidized and so on.

The present invention adopt following technical solutions.

A memory protection device comprises an insulating heat-conducting bar, wherein a memory is inserted in a slot of a memory connection base and fixed on the memory connection base through fasteners at two ends of the memory connection base, and the insulating heat-conducting bar is connected to upper ends of slot arms at two sides of the memory connection base and covers up heat emitting holes of the slot arms at the two sides of the memory connection base.

The insulating heat-conducting bar has a width identical to a thickness of the slot arm at the side of the memory connection base and a length identical to a length of the slot arm.

The memory protection device further comprises a heat-conducting board sticking with a lateral of the memory and contacting with the insulating heat-conducting bar, wherein the heat-conducting board is stuck with memory granules of the memory through silica gel papers.

A concave slot paralleling with the slot of the memory connection base is provided at an upper end of the insulating heat-conducting bar and a lower end of the heat-conducting board is inserted in the concave slot.

The present invention further provides a computer motherboard comprising the above memory protection device which is provided on a memory connection base of the computer motherboard.

The memory protection device further comprises a heat-conducting mask covering upon the memory and insulatedly contacting with electrical elements on the memory. The heat-conducting mask has an upper end closed and a lower end open. Upper parts of two ends of the heat-conducting mask are closed and connected to two ends of a wiring board of the memory by clipping; lower parts of the two ends of the heat-conducting mask are closed; two laterals of the heat-conducting mask are T-shaped; the lower end of the heat-conducting mask contacts with the insulating heat-conducting bar.

The concave slot paralleling with the slot of the memory connection base is provided at the upper end of the insulating heat-conducting bar and the lower end of the heat-conducting mask is inserted in the concave slot.

The heat-conducting mask is fixedly connected to the memory. An upper end of an internal side of the heat-conducting mask resists against an upper end of the wiring board of the memory.

The heat-conducting mask is stuck with the memory granules of the memory through the insulating heat-conducting bar provided in an internal part of the heat-conducting mask.

A hook is provided at a lower end of the upper part at the end of the heat-conducting mask so as to be fastened with an upper end of a bayonet connector at an upper part of the end of the wiring board of the memory.

The lower parts of the two ends of the heat-conducting mask closely contact with the internal side of the fastener arms at the two ends of the memory connection base and the wiring board of the memory.

The insulating heat-conducting bar is made of an elastic rubber.

The insulating heat-conducting bar has a thermal expansion coefficient from 0 to 20%. A too large thermal expansion coefficient would result in that the heat-conducting board or the heat-conducting mask is squeezed by swelling rubber and even the memory bar may be damaged or detached.

The heat-conducting mask is a rigid metal mask made of copper or aluminum. An insulating material is provided in the internal part of the metal mask and contacts with the memory.

The present invention further provides a computer comprising a computer motherboard and a memory, wherein the computer motherboard comprises a memory connection base. The computer is characterized in further comprising the above memory protection device.

The present invention has following beneficial technical results.

Firstly, the insulating heat-conducting bar is provided on the heat emitting holes so as to effectively prevent dust from entering the slot of the memory connection base.

Secondly, the heat-conducting board and the heat-conducting mask contacts with the insulating heat-conducting bar so as to effectively solve a problem of heat dissipation.

Thirdly, the heat-conducting mask covers upon the memory and the heat-conducting mask and the insulating heat-conducting bar closely contact with each other, in such a manner that the contact surface between the connecting fingers of the memory and the air outside is greatly reduced and an oxidation speed of the memory is slowed down.

Fourthly, the elastic insulating heat-conducting bar is connected to the heat-conducting mask by inserting and the heat-conducting mask is fixedly connected to the memory so as to avoid loosening the memory caused by a rigid fixation of the memory and the memory slot.

DETAILED DESCRIPTION OF THE PREFERRED EMBODIMENT

Figure 1:
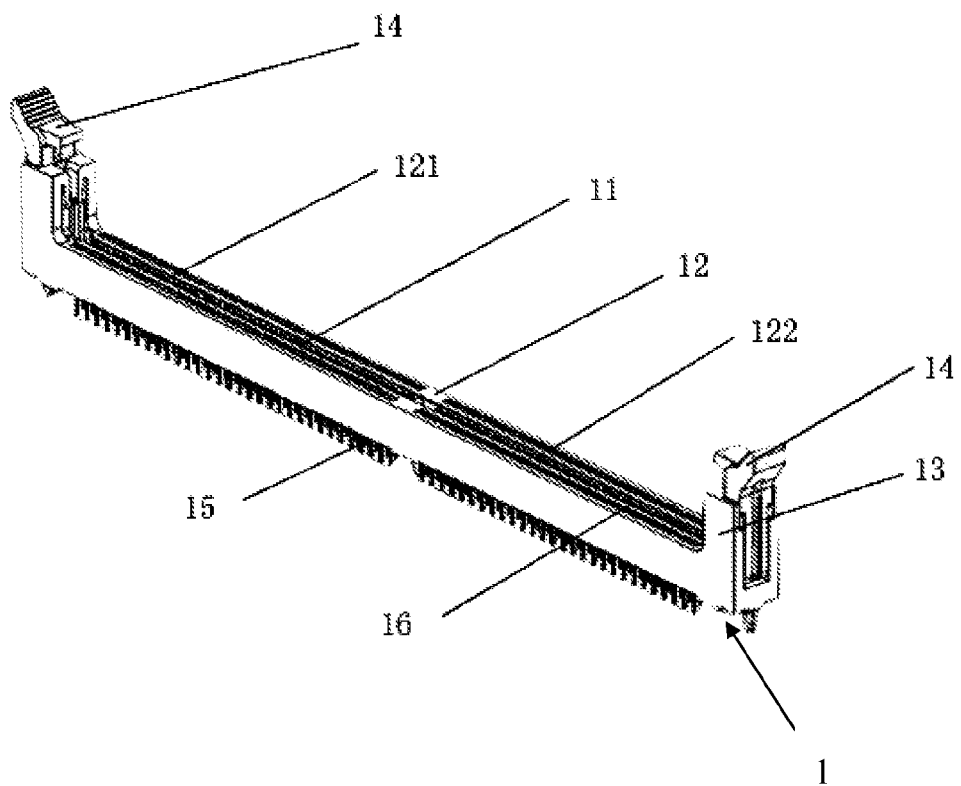
FIG. 1 is a perspective view of a memory connection base according to the prior art.
Figure 2:
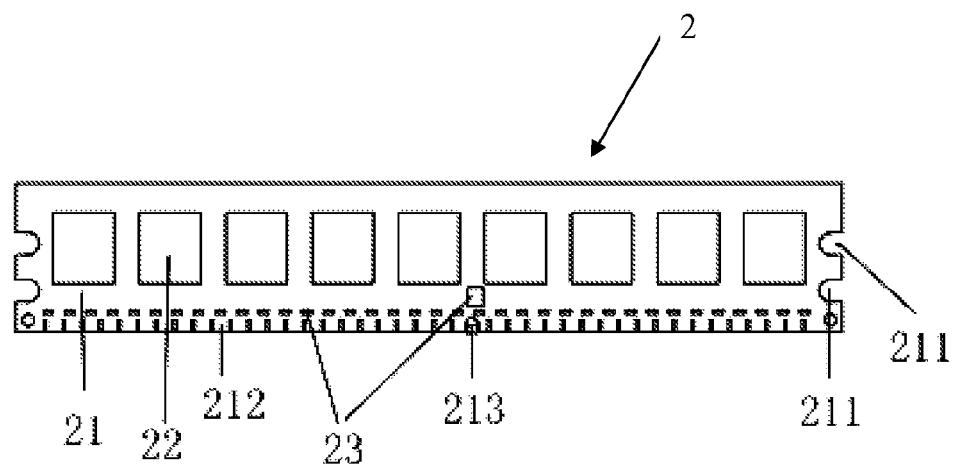
FIG. 2 is a front view of a memory according to the prior art.
Figure 3:
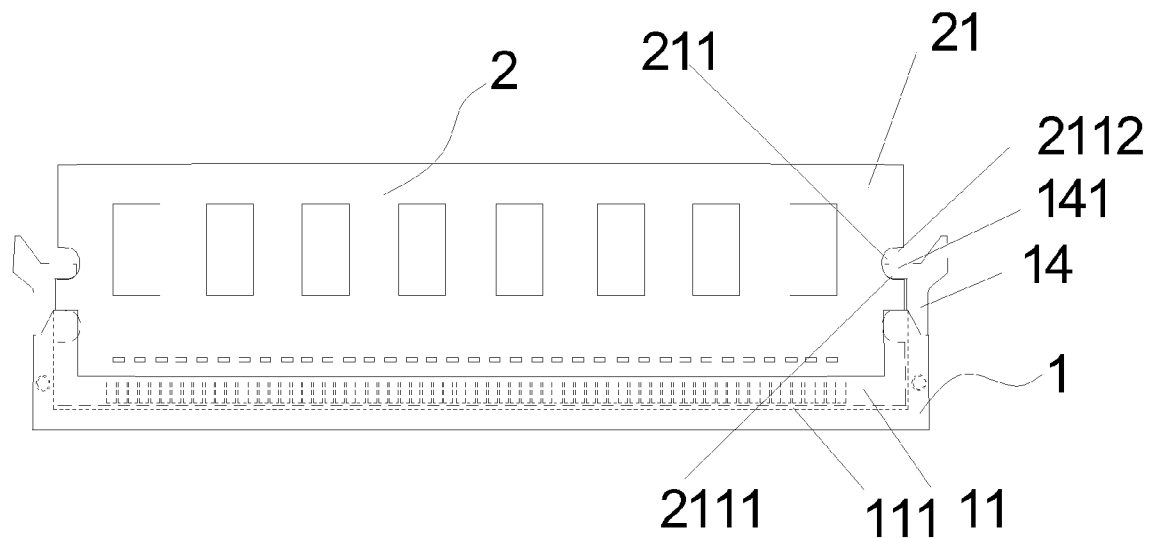
FIG. 3 is a front view of the memory plugged in the memory connection base according to the prior art.
Figure 4:
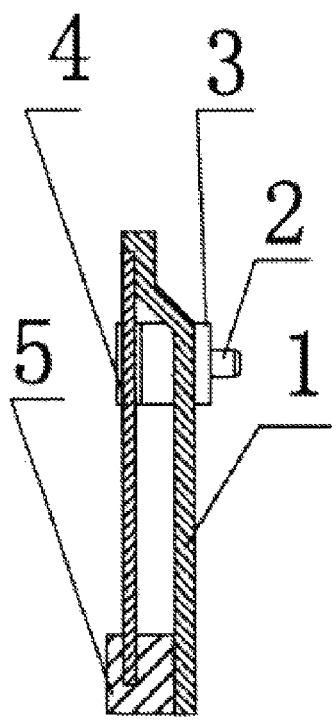
FIG. 4 is a side view of a memory dustproof device according to a Chinese patent of 200620083522.

The present invention relates to a device protecting a memory against dust, loosening and oxidation based on a conventional memory connection base, a conventional memory structure and a conventional connecting structure between the memory connection base and the memory which are standard in the art as shown in FIG. 1, FIG. 2 and FIG. 3. The present invention is not only able to simultaneously protect against dust, loosening and oxidation without changing structures of the memory connection base and the memory, but also able to be compatible with the conventional memory connection base and the conventional memory and be widely applied.

Combined with the preferred embodiments and the drawings, the present invention is further illustrated as follows.

A First Preferred Embodiment

Figure 5:
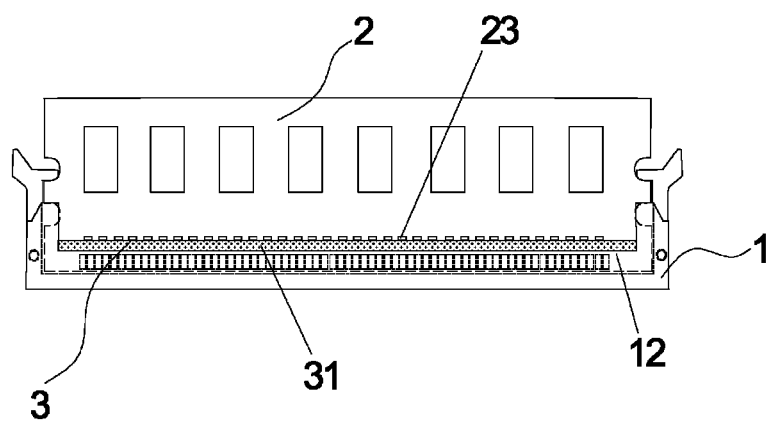
FIG. 5 is a front view of a memory protection device according to a first preferred embodiment of the present invention.
Figure 6:
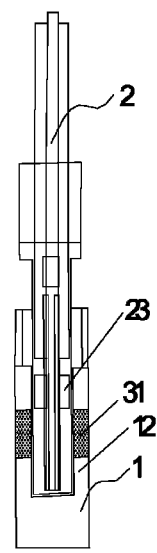
FIG. 6 is a side view of the memory protection device according to the first preferred embodiment of the present invention.

As shown in FIG. 5 and FIG. 6, a memory protection device 3 comprises two insulating heat-conducting bars 31 respectively connected to two upper ends of slot arms 12 at two laterals of a memory connection base 1 in a way of sticking.

As shown in FIG. 1, the memory connection base 1 has a long memory slot 11 and comprises two hook fasteners 14 at two ends of the memory slot 11 and a plurality of pins 15 at a bottom of the memory slot 11. The memory slot 11 is for being plugged by a memory 2. A plurality of perforated holes 121 are provided at an internal side of the slot arms 12 at two sides of the memory slot 11 for providing elastic reeds 16 which is connected to the plurality of pins 15 at the bottom of the memory slot 11 and contacts with memory connecting fingers 212; heat emitting holes 122 communicated with the plurality of perforated holes 121 are further provided the two upper ends of the slot arms 12 for emitting heat produced by charging the memory connecting fingers 212 and the elastic reeds 16.

The heat emitting holes 122 and the plurality of perforated holes 121 are respectively communicated with each other. The plurality of perforated holes 121 are provided with the elastic reeds 16 which contact with the connecting fingers 212. Thus dust coming from the heat emitting holes 122 tends to arrive at the memory connecting fingers 212 and the elastic reeds 16. Since the heat produced by charging the memory connecting fingers 212 and the elastic reeds 16 is not too much, the insulating heat-conducting bars 31 are provided to cover up the heat emitting holes 122 of the slot arms 12 at the two sides of the memory connection base 1.

In FIG. 5 and FIG. 6, two insulating heat-conducting bars 31 are respectively provided at the upper ends of the slot arms 12 at the two sides of the memory connection base 1. Preferably, a flat surface of a lower end of the insulating heat-conducting bar 31 is connected to a flat surface of an upper end of the slot arm 12 in a way of sticking; the insulating heat-conducting bar 31 has a length identical to a length of the slot arms 12 at the two sides of the memory connection base 1, a width identical to a thickness of the slot arms 12 and a height around 1 mm, so as to protect electrical elements 23 on the memory 2 from being resisted by a too high insulating heat-conducting bar 31.

It is worth mentioning that the first preferred embodiment only provides a preferable technical solution. Based on the first preferred embodiment, subordinate technical solutions are following. The insulating heat-conducting bar is supposed to have a length and a width which are only required to be big enough to cover up all the heat emitting holes on the slot arms because two heads and a middle part of the upper end of the slot arms partially have no heat emitting holes, and a height which is only required to not resist against the electrical elements of the memory.

The insulating heat-conducting bars are provided to cover up the heat emitting holes so as to effectively prevent the dust from entering the memory connecting fingers and the elastic reeds of the connection base through the heat emitting holes.

The insulating heat-conducting bars can be made of insulating heat-conducting plastic or elastic insulating heat-conducting rubber. The insulating heat-conducting bar is preferred to be made of elastic insulating heat-conducting rubber. Reasons are following.

(1) Different arrangements of the electrical elements on the memory lead to different distances between the electrical elements near lower parts of the connecting fingers and the insulating heat-conducting bars. The elastic rubber is able to prevent a resisting contact between the too low electrical elements on the memory and the insulating heat-conducting bars and protect the memory from being damaged by an insertion of the memory.

(2) The elastic rubber contributes to further preventing the dust from entering the memory connecting fingers and the elastic reeds of the memory connection base.

(3) The elastic rubber contributes to prevent loosening the memory when the computer is being moved.

A Second Preferred Embodiment

Figure 7:
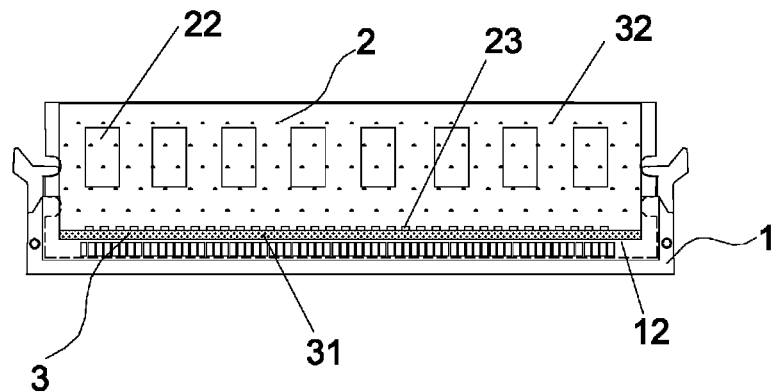
FIG. 7 is a front view of the memory protection device according to a second preferred embodiment of the present invention.
Figure 8:
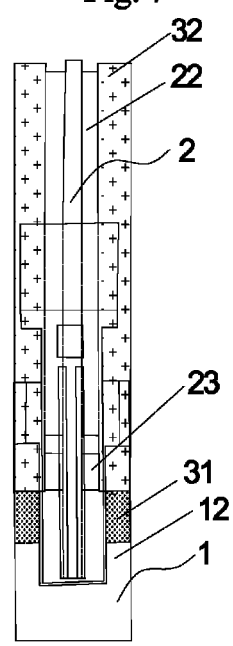
FIG. 8 is a side view of the memory protection device according to the second preferred embodiment of the present invention.
Figure 9:
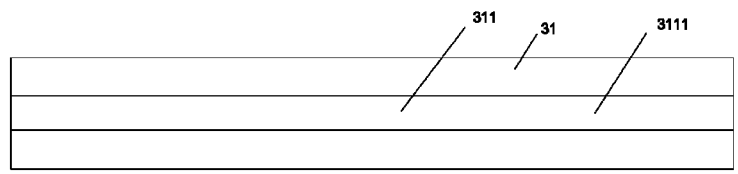
FIG. 9 is a top view of an insulating heat-conducting bar according to a third preferred embodiment of the present invention.
Figure 10:
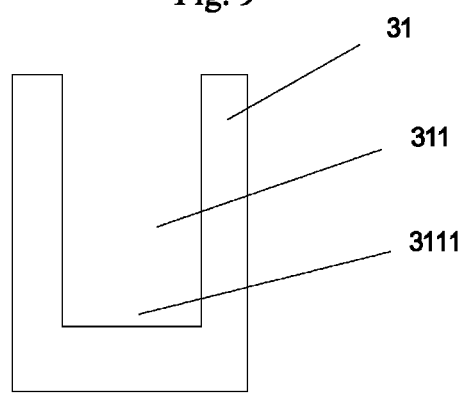
FIG. 10 is a side view of the insulating heat-conducting bar according to the third preferred embodiment of the present invention.
Figure 11:
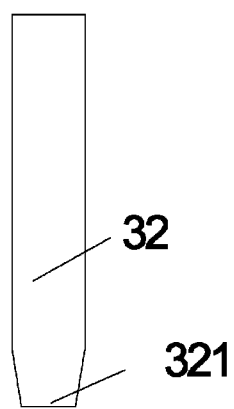
FIG. 11 is a side view of a heat-conducting board according to the third preferred embodiment of the present invention.
Figure 12:
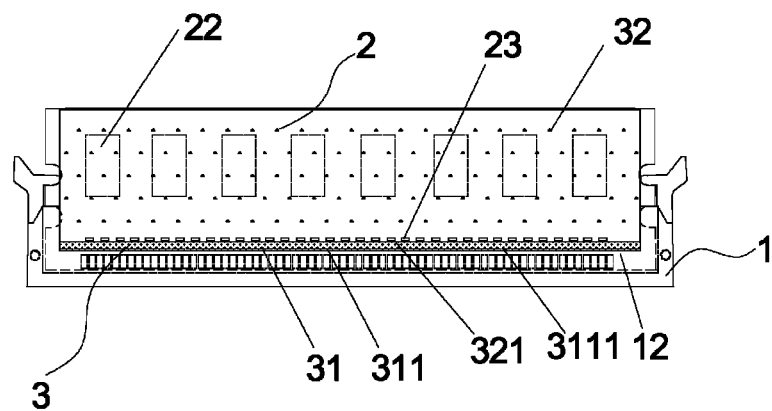
FIG. 12 is a front view of the memory protection device according to the third preferred embodiment of the present invention.
Figure 13:
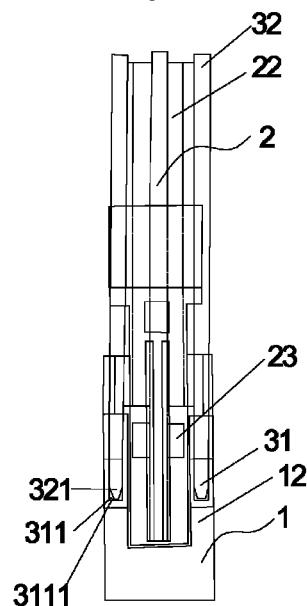
FIG. 13 is a side view of the memory protection device according to the third preferred embodiment of the present invention.

In the first preferred embodiment, the insulating heat-conducting bars are provided to prevent the dust from entering through the heat emitting holes and also prevent a dissipation of the heat produced by charging the memory connecting fingers and the elastic reeds. In order to improve a heat dissipation performance of the memory protection device, FIG. 7 and FIG. 8, based on the first preferred embodiment, show the memory protection device 3 which further comprises two plate-shaped heat-conducting boards 32 respectively sticking with two sides of the memory 2, wherein the heat-conducting boards 32 further contact with the insulating heat-conducting bars 31, which means that the heat-conducting board 32 has a lower end contacting with the insulating heat-conducting bar 31 and an upper end on an identical level with or slightly lower than an upper end of the memory, so as to provide convenience in inserting the memory. A length of the heat-conducting boards 32 is unlimited and preferred to be long enough to cover up all memory granules 22 to maximize the heat dissipation. The heat-conducting boards 32 are stuck with the memory granules 22 in a fixed way so that a width thereof is required to meet a requirement that, when the memory is fully plugged into the slot of the memory connection base, the lower ends of the heat-conducting boards 32 just resist against the insulating heat-conducting bar 31. Or the heat-conducting boards 32 tend to displace so that the memory granules 22 or the sticking materials between the heat-conducting boards 32 and the memory granules 22 are damaged.

The heat-conducting boards 32 can be made of heat-conducting and insulating plastic or rubber or copper plates or aluminum plates. When the heat-conducting boards 32 are made of copper or aluminum, contact positions between the heat-conducting boards 32 and the memory granules 22 or between the heat-conducting boards 22 and the electrical elements on the wiring board need to be provided with insulating materials. The insulating material is preferred to be silica gel paper since the silica gel paper is heat-conducting and thus able to help the memory connecting fingers and the memory granules to dissipate heat.

A Third Preferred Embodiment

Based on the second preferred embodiment, as shown in FIGS. 9, 10, 11, 12 and 13, a concave slot 311 paralleling with the slot 11 of the memory connection base 1 is provided on an upper end of the insulating heat-conducting bar 31, and the lower ends 321 of the heat-conducting boards 32 are plugged into the concave slot 311. The concave slot 311 is cuboid and has a width identical to a thickness of the heat-conducting boards 32 and a length identical to the length of the heat-conducting boards 32. The lower ends 321 of the heat-conducting boards 32 are blade-shaped wedges so as to provide convenience in inserting the heat-conducting boards 32 into the concave slot 311 without leaving space therebetween. Preferably, when the memory 2 is fully plugged into the slot 11 of the memory connection base and fixed therein, there is no space left between the heat-conducting boards 32 and the concave slot 311 after plugging the heat-conducting boards 32 into the concave slot 311, in such a manner that the dust is hardly able to enter the concave slot 311 and the lower ends 321 of the heat-conducting boards 32 exactly resist against a bottom 3111 of the concave slot 311.

The concave slot 311 contributes to enlarging the contact surfaces between the insulating heat-conducting bars and the heat-conducting boards, improving the heat dissipation and fixing the heat-conducting boards.

A Fourth Preferred Embodiment

Figure 14:
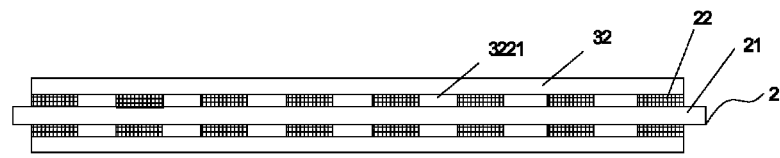
FIG. 14 is a top view of the memory protection device according to the third preferred embodiment of the present invention.

In the second preferred embodiment and the third second preferred embodiment, as shown in FIG. 14, there is a gap between the upper end 322 of the heat-conducting board 32 and the upper end of the wiring board 21 of the memory 2 caused by a separation of the memory granules 22, through which the dust is still able to enter the memory connecting fingers 212 and the memory granules 22 to affect an electrical performance of the memory 2. Thus, in the fourth preferred embodiment, a heat-conducting mask is adopted to cover upon the memory 2 and an upper end thereof is sealed. Detailed illustration is following.

Figure 15:
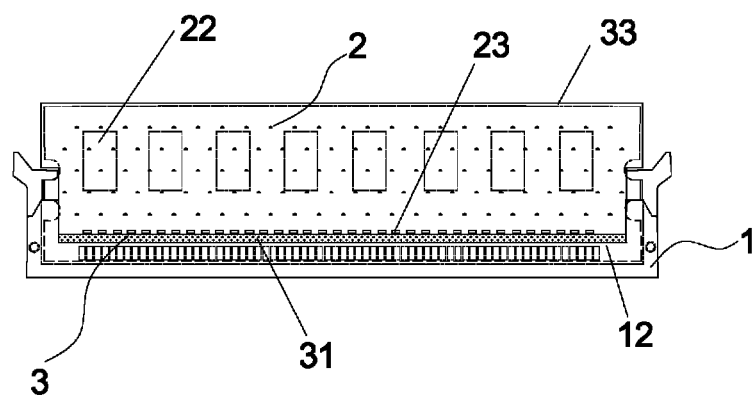
FIG. 15 is a front view of the memory protection device according to a fourth preferred embodiment of the present invention.
Figure 16:
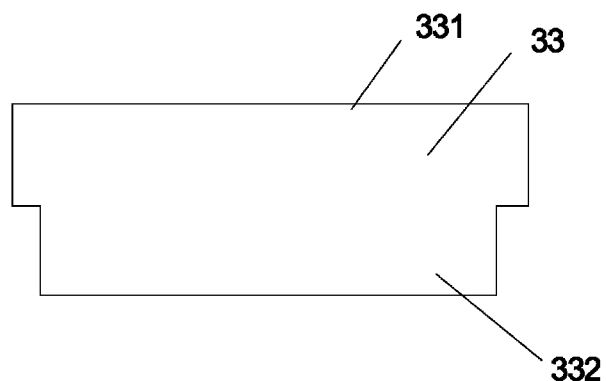
FIG. 16 is a front view of a protective mask according to the fourth preferred embodiment of the present invention.
Figure 17:
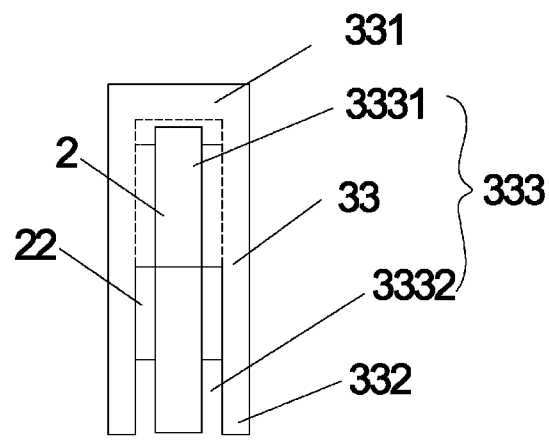
FIG. 17 is a side view of the protective mask according to the fourth preferred embodiment of the present invention.

As shown in FIGS. 15, 16 and 17, based on the first preferred embodiment and inspired by the second preferred embodiment, the memory protection device 3 further comprises a heat-conducting mask 33 for covering upon the memory and contacting with the electrical elements on the memory with insulation. The heat-conducting mask 33 has an upper end 331 closed and a lower end 332 open. The lower end 332 of the heat-conducting mask contacts with the insulating heat-conducting bars 31. A length of the insulating heat-conducting bars 31 is identical to a length of the heat-conducting mask 33. Preferably, the upper end of the memory 2 is fully covered by the upper end 331 of the heat-conducting mask 33; an upper part 3331 of two ends 333 of the heat-conducting mask 33 are closed and connected to two ends of the wiring board 21 of the memory 2 by clipping; a lower part 3332 of the two ends 333 of the heat-conducting mask 22 is open and closely contacts with fastener arms 13 at the two ends of the memory connection base 1; a front view of two sides of the heat-conducting mask 33 is T-shaped so as to further prevent the dust from entering the memory connecting fingers 212 and the elastic reeds 16 of the memory connection base 1. The heat-conducting mask 33 covers upon the memory so that the heat-conducting mask 22 contributes to fixing the memory without being stuck with the memory granules 22.

Before the heat-conducting mask is fixedly connected to the memory, an installing can start with plugging the memory into the slot of the memory connection base and continue with covering the heat-conducting mask upon the memory and pressing downwards to allow the heat-conducting mask to contact with the insulating heat-conducting bars.

A Fifth Preferred Embodiment

Figure 18:
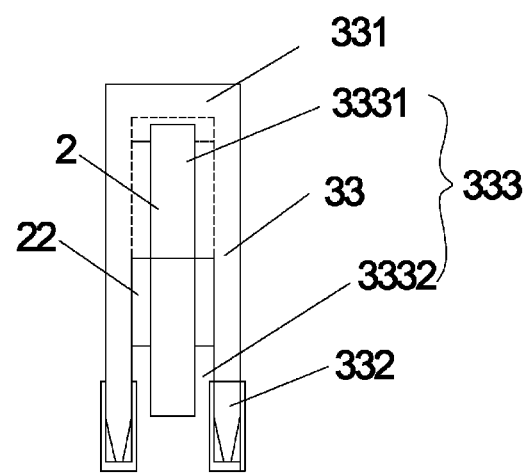
FIG. 18 is a side view of the memory protection device according to a fifth preferred embodiment of the present invention.

Based on the fourth preferred embodiment and inspired by the third preferred embodiment, as shown in FIG. 18, the concave slot 311 paralleling with the slot of the memory connection base is provided at the upper end of the insulating heat-conducting bar 31; the lower end 332 of the heat-conducting mask 33 is plugged into the concave slot 311; the concave slot 311 is cuboid; the lower end 332 of the heat-conducting mask 33 is a blade-shaped wedge; a width of the concave slot 311 is identical to a thickness of a side of the heat-conducting mask 33; there is no gap between the heat-conducting mask 33 and the concave slot 311 after plugging the lower end 332 of the heat-conducting mask 33 into the concave slot 311 so that the dust is hardly able to enter the concave slot 311. A design of a concave slot contributes to enlarging the contact surfaces between the insulating heat-conducting bars and the heat-conducting boards, improving the heat dissipation and fixing the heat-conducting mask.

A Sixth Preferred Embodiment

In the fourth preferred embodiment and the fifth preferred embodiment, many memory granules and other electrical elements are arranged out of the memory and the heat-conducting mask needs to be fastened and pulled while plugging and pulling the memory, during which an internal surface of the heat-conducting mask is able to break the memory granules or the other electrical elements. Thus a preferred design is to fixedly connect the heat-conducting mask to the memory. Detailed illustration is following.

Based on the fifth preferred embodiment, the heat-conducting mask is stuck with the memory granules through the insulating heat-conducting bars provided in the internal part of the heat-conducting mask; the lower parts of the two ends of the heat-conducting mask and the edges of the memory wiring board are sealed with insulating materials to further prevent the dust from entering.

Moreover, the gap between the heat-conducting mask and the memory wiring board and a close contact between the heat-conducting mask and the fastener arms at the two ends of the memory connection base strengthen a sealing performance between the heat-conducting mask and the memory connection base or the memory and effectively prevent the dust and the air from entering so as to protect against the dust and the oxidation.

The heat-conducting mask and the memory moves simultaneously after being fixedly connected with each other. The heat-conducting mask covers upon the memory and a purpose of inserting the memory is realized by pressing the heat-conducting mask or realized by pressing the wiring board of the memory when there is no heat-conducting mask. If there is a gap between the upper end of the internal side of the heat-conducting mask and the upper end of the memory wiring board, pressing the heat-conducting mask may break the memory granules or the other electrical elements. Thus the upper end of the internal side of the heat-conducting mask is required to resist against the upper end of the memory wiring board.

A Seventh Preferred Embodiment

In the sixth preferred embodiment, the heat-conducting mask is fixed with the memory and the lower end of the heat-conducting mask and the lower end of the memory are plugged into the concave slot. Preferably, when the memory is fully plugged into the slot of the memory connection base, the lower end of the heat-conducting mask exactly resists against the bottom of the concave slot. If a length of the lower end of the heat-conducting mask is longer than the length when the lower end of the heat-conducting mask exactly resists against the bottom of the concave slot, the heat-conducting mask would be pushed upwardly by the insulating heat-conducting bars; while "ear fasteners" at the two ends of the memory connection base are stuck in bayonet connectors at the two ends of the memory wiring board and thus the memory is applied with a downward force, once a length of the lower end of the heat-conducting mask is too long, the memory granules or the insulating heat-conducting bar sticking between the memory and the heat-conducting mask may be damaged.

Figure 19:
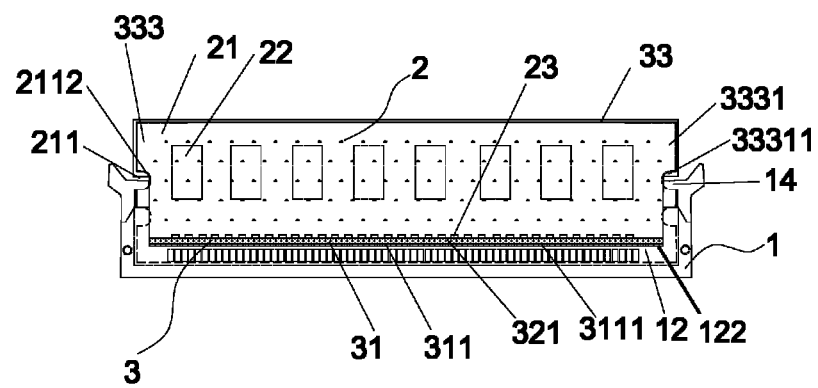
FIG. 19 is a front view of the memory protection device according to a seventh preferred embodiment of the present invention.
Figure 20:
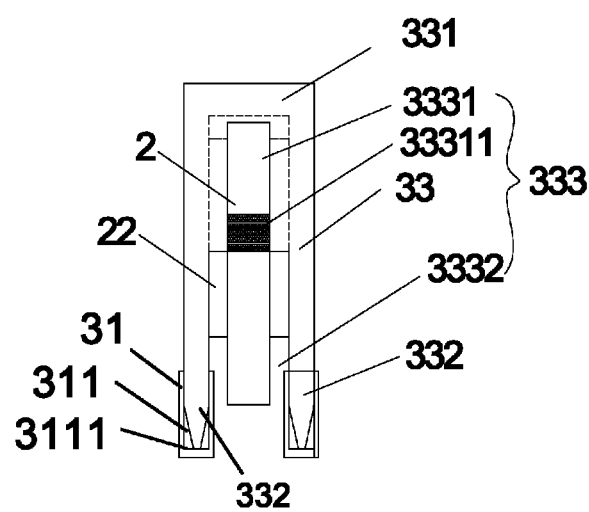
FIG. 20 is a side view of the memory protection device according to the seventh preferred embodiment of the present invention.

Thus, based on the sixth preferred embodiment, as shown in FIG. 19 and FIG. 20, a "hook" 33311 is provided at a lower end of the upper part 3331 of the two ends 33 of the heat-conducting mask 33 to be fastened with upper ends 2112 of upper bayonet connectors 211 at the two ends of the wiring board 21 of the memory 2, which is similar to that the two hook fasteners 14 of the two ends of the memory connection base 1 buckle up the wiring board 21 of the memory 2. When the memory 2 is plugged in the memory connection base 1, the "hook" 33311 applies a force on the memory at a direction opposite to a direction of a force applied by the hook fastener 14 on the memory 2. Under a protection of the "hook" 33311, even a length of the lower end of the heat-conducting mask is longer than the length when the lower end of the heat-conducting mask exactly resists against the bottom of the concave slot, the memory granules and the insulating heat-conducting bar sticking between the memory and the heat-conducting mask are not necessarily damaged.

Besides, since the elastic insulating heat-conducting rubber bars 31 resist against the lower end 332 of the heat-conducting mask 33 and the heat-conducting mask 33 is fixedly connected to the memory 2, there is an elastic connection between the memory 2 and the memory connection base 1 after the memory 2 is fixed by the two hook fasteners 14 at the two ends of the memory connection base 1, which efficiently avoid loosening the connection between the memory and the memory connection base when the computer is being shaken.

Thus it is necessary to design that a length of the lower end of the heat-conducting mask is slight longer than the length when the lower end of the heat-conducting mask exactly resists against the bottom of the concave slot so that the elastic insulating heat-conducting rubber bars are pressed to further strengthen the connection between the memory and the memory connection base.

The "hook" of the heat-conducting mask and the edges of the memory wiring board are sealed with insulating rubber.

The heat-conducting mask is a rigid metal mask, made of copper or aluminum.

The above memory protection device greatly protects the memory against the dust, the loosening and the oxidation, in such a manner that a working stability is greatly strengthened without frequently inserting and pulling the memory and cleaning the memory made by man after the memory is installed on the computer; that chance for the memory to contact with inorganic salt or other corrosive matters is greatly reduced to further slow down an oxidation speed of the memory connecting fingers.

The present invention takes a good advantage of the elastic insulating heat-conducting rubber bar and the rigid heat-conducting mask to protect the memory against the dust, the loosening and the oxidation so as to thoroughly solve the problems of a computer crash, a blue screen or a restart caused by a failure in an electrical connection between the memory and the memory connection base.

The present invention further provides a computer. The computer comprises a motherboard and a memory. The motherboard comprises a memory connection base. The computer is characterized in further comprising the above memory protection device which is compatible with the conventional memory connection base and the memory and thus applies to a conventional computer.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A memory protection device, comprising:
   insulating heat-conducting bars, for being respectively provided on upper ends of slot arms at two sides of a memory connection base and for covering up heat emitting holes which are provided at the upper ends of the slot arms to prevent dust from entering through the heat emitting holes, wherein each said insulating heat-conducting bar has a concave slot; and
   a heat-conducting mask for covering upon a whole of a memory bar and contacting with memory granules on the memory bar, wherein said heat-conducting mask has an upper end closed and a lower end open; upper parts of two ends of said heat-conducting mask are closed and are for connecting to two ends of a wiring board of the memory bar by clipping; lower parts of said two ends of said heat-conducting mask are open; two sides of said heat-conducting mask are T-shaped; said lower end of said heat-conducting mask contacts with said insulating heat-conducting bars;
   wherein said concave slot parallels with the slots of the memory connection base; said lower end of said heat-conducting mask is plugged into said concave slots, so that the memory bar is covered by said heat-conducting mask which closely contacts said insulating heat-conducting bar, in such a manner that a contact surface between the memory bar and air is greatly reduced and an oxidation speed of the memory bar is slowed down;
   wherein said concave slot is as wide as each said side of said heat-conducting mask, in such a manner that no gap is left between said heat-conducting mask and said concave slot, so that the dust is hardly able to enter said concave slot.

2. The memory protection device, as recited in claim 1, wherein an upper end of said insulating heat-conducting bar has a concave slot paralleling with a slot of the memory connection base and said lower end of said heat-conducting mask is plugged into said concave slot.

3. The memory protection device, as recited in claim 1, wherein a heat-conducting mask is fixedly connected to a memory bar and an upper end of an internal side of said heat-conducting mask resists against an upper end of a wiring board of a memory.

4. The memory protection device, as recited in claim 3, wherein an internal part of said heat-conducting mask is provided with said insulating heat-conducting bars through which said heat-conducting mask are stuck with memory granules of a memory bar.

5. The memory protection device, as recited in claim 3, wherein a hook is provided at a lower end of an upper part at each of two ends of said heat-conducting mask to be fastened with an upper end of an upper bayonet connector at each of two ends of the wiring board of the memory.

6. The memory protection device, as recited in claim 4, wherein a hook is provided at a lower end of an upper part at each of two ends of said heat-conducting mask to be fastened with an upper end of an upper bayonet connector at each of two ends of the wiring board of the memory.

7. The memory protection device, as recited in claim 1, wherein said insulating heat-conducting bars are made of elastic rubber.

8. A computer comprising a motherboard and a memory, wherein said motherboard comprises a memory connection base and said computer further comprises said memory protection device as recited in claim 1.

9. The memory protection device, as recited in claim 1, wherein each said concave slot is provided at an upper end of said insulating heat-conducting bar; said concave slot is cuboid; and said lower end of said heat-conducting mask are blade-shaped wedges, for facilitating inserting said lower end of said heat-conducting mask into said concave slots.

10. The memory protection device, as recited in claim 9, wherein said heat-conducting mask is for fixedly connecting with memory granules of the memory bar via sticking, in such a manner that said heat-conducting mask is forbidden to break the memory granules of the memory bar.

11. The memory protection device, as recited in claim 10, wherein said heat-conducting mask has a hook provided at each lower end of said upper part of said two ends of said heat-conducting mask, for being fastened with upper ends of upper bayonet connectors at the two ends of the wiring board of the memory bar and then applying a force on the memory bar at a direction opposite to a direction of a force applied by a hook fastener on the memory, in such a manner that the memory bar and said insulating heat-conducting bars are not necessarily damaged.

12. The memory protection device, as recited in claim 11, wherein said heat-conducting mask is a rigid metal mask; said insulating heat-conducting bars are made of elastic rubber having a thermal expansion coefficient from 0 to 20%, for avoiding loosening a connection between the memory and the memory connection base when being shaken.

13. The memory protection device, as recited in claim 12, wherein each said hook of said heat-conducting mask is sealed with edges of the memory wiring board via insulating rubber.

* * * * *